US 12,091,266 B2

(12) United States Patent
Daniel et al.

(10) Patent No.: US 12,091,266 B2
(45) Date of Patent: Sep. 17, 2024

(54) DEVICE FOR HANDLING PALLETS

(71) Applicant: Swisslog AG, Buchs (DE)

(72) Inventors: Kai Daniel, Bochum (DE); Christian Kreth, Karlsruhe (DE); Carsten Krewet, Dortmund (DE)

(73) Assignee: Swisslog AG, Buchs (DE)

(*) Notice: Subject to any disclaimer, the term of this patent is extended or adjusted under 35 U.S.C. 154(b) by 0 days.

(21) Appl. No.: 17/623,660

(22) PCT Filed: Jul. 6, 2020

(86) PCT No.: PCT/EP2020/068931
§ 371 (c)(1),
(2) Date: Dec. 29, 2021

(87) PCT Pub. No.: WO2021/001575
PCT Pub. Date: Jan. 7, 2021

(65) Prior Publication Data
US 2022/0258991 A1   Aug. 18, 2022

(30) Foreign Application Priority Data
Jul. 4, 2019   (DE) .................. 20 2019 002 787.4

(51) Int. Cl.
*B65G 57/03*   (2006.01)
(52) U.S. Cl.
CPC ........ *B65G 57/035* (2013.01); *B65G 2207/08* (2013.01)

(58) Field of Classification Search
CPC ...... B65G 57/035; B65G 61/00; B65G 57/06; B65G 57/245; B65G 57/00; B65G 57/03; B65G 57/22; B65G 2201/0267; B65G 2207/08

See application file for complete search history.

(56) References Cited

U.S. PATENT DOCUMENTS

| 4,205,934 A * | 6/1980 | Pantin .................. B65G 57/24 414/796.2 |
| 4,778,323 A | 10/1988 | Salts |
| 7,770,868 B2 * | 8/2010 | Koop ....................... B66B 9/04 187/274 |

(Continued)

FOREIGN PATENT DOCUMENTS

| CA | 2877946 A1 * | 1/2014 | ............ B65G 47/46 |
| DE | 1215591 B | 4/1966 | |

(Continued)

OTHER PUBLICATIONS

European Patent Office; Search Report in related International Patent Application No. PCT/EP2020/068931 dated Oct. 9, 2020; 3 pages.

*Primary Examiner* — Gregory W Adams
(74) *Attorney, Agent, or Firm* — Dorton & Willis, LLP

(57) ABSTRACT

A device for handling a pallet includes a pallet through-opening, through which a pallet can be vertically moved while oriented horizontally. The pallet through-opening has in particular at least one extension, which is more than 1200 mm wide and 1200 mm deep, and at least one sidewall, which are each arranged along an associated side of the pallet through-opening. At least one of the sidewalls is detachable or movable.

17 Claims, 5 Drawing Sheets

(56) References Cited

U.S. PATENT DOCUMENTS

| | | | | |
|---|---|---|---|---|
| 8,465,249 B2* | 6/2013 | Zahn | ............... | B65G 47/90 |
| | | | | 271/192 |
| 9,776,812 B2* | 10/2017 | Cavelius | ............ | B65G 47/82 |
| 2002/0064449 A1 | 5/2002 | Vincent et al. | | |
| 2009/0136328 A1* | 5/2009 | Schafer | ............ | B65G 1/026 |
| | | | | 414/807 |
| 2014/0026524 A1 | 1/2014 | Rooyakkers | | |
| 2014/0374193 A1* | 12/2014 | Meijer | ............... | B66F 9/12 |
| | | | | 187/237 |
| 2015/0360809 A1* | 12/2015 | McBride | ......... | B65D 19/0095 |
| | | | | 108/57.17 |
| 2017/0043986 A1 | 2/2017 | Ducharme et al. | | |

FOREIGN PATENT DOCUMENTS

| | | | | |
|---|---|---|---|---|
| DE | 1952509 A1 | 4/1971 | | |
| DE | 4329180 A1 | 3/1995 | | |
| DE | 4329180 C2 * | 5/1996 | ............ | B65B 69/00 |
| DE | 202016001581 U1 | 6/2017 | | |
| EP | 1291307 A1 | 3/2003 | | |
| WO | 2017221140 A1 | 12/2017 | | |

\* cited by examiner

DEVICE FOR HANDLING PALLETS

CROSS-REFERENCE TO RELATED APPLICATIONS

This application is a national phase application under 35 U.S.C. § 371 of International Patent Application No. PCT/EP2020/068931, filed Jul. 6, 2020 (pending), which claims the benefit of priority to German Patent Application No. DE 20 2019 002 787.4, filed Jul. 4, 2019, the disclosures of which are incorporated by reference herein in their entirety.

TECHNICAL FIELD

The invention relates to a device for handling pallets.

BACKGROUND

With the help of special light goods conveyor technology, groups of packages can be formed so that they can be brought onto a pallet using a multiple palletizing gripper. The resulting mixed pallets are built using a stacking algorithm to form the most compact and stable pallets possible. During the palletizing, the pallet can stand on a vertically movable device or lift, wherein, during or after the formation of the pallets, the lift on which the pallet is standing is successively lowered and wrapped with a film (wrapper) to secure the palletized goods during transport. The combination is also called a lift wrapper station.

There are more than 50 pallet formats worldwide, meaning that, as a rule, a completely new design is made for each palletizing station, depending on the pallet sizes to be used by the end customer. This includes 3D drawing, static calculation, cell layout and, consequently, electrical planning (especially cable routes). This entails considerable additional work for each configuration. The largest pallet edge (length or width) is 1220 mm. This means that all common pallet formats can be transported through the lift wrapper station in an opening of 1220 mm×1220 mm. One problem, however, is that the sidewalls serve to support the packages and are necessary in the process. In other words, it is not sufficient to only enlarge the opening of the lift wrapper station. There must be sidewalls available for support.

SUMMARY

It is an object of the invention to provide a device for handling pallets that is of simple design and can be used universally.

One aspect of the invention relates to a device for handling a pallet, wherein the device comprises one or more of the following features:
- a pallet through-opening, through which a pallet can be vertically moved while oriented horizontally, wherein the pallet through-opening has in particular at least one extension, which is more than 1200 mm wide and 1200 mm deep;
- at least one, in particular four, sidewalls, which are each arranged along an associated side of the pallet through-opening, wherein at least one of the sidewalls is detachable or movable;
- at least one closure device, which can cover or close at least some regions of the pallet through-opening, wherein the at least one closure device is detachable or movable;
- a pallet carrying means, which is designed to carry the pallet;
- at least one sensor that can detect the position of the pallet or the upper edge of the pallet;
- a recess in the bottom, which in the lowest position of the pallet carrying means can accommodate said pallet carrying means at least in some regions;
- a lowering device, which takes the built pallet at the lowest position of the pallet carrying means and moves it further downwards.

The pallet through-opening of the lift wrapper station preferably has a maximum format, i.e., at least one opening of 1000 mm×1000 mm, preferably at least one opening of 1200 mm×1200 mm, particularly preferably an opening of at least 1220 mm×1220 mm.

The statics, sensors, electrics, etc. can advantageously be designed for a station having the maximum dimensions such that the same parts can be used for all applications.

Preferably, at least one, two, three or four sidewalls can be arranged or mounted on the/all sides of the pallet through-opening and in particular form a shaft in which the built pallet is arranged such that the packaged goods cannot fall off the pallet. The gap between the pallet and the shaft wall is preferably smaller than 50 mm, in particular smaller than 20 mm. One or more of the sidewalls can be arranged in different positions or are displaceable. Preferably, the sidewall can be provided by hooking it in (in pre-punched grooves) and provided with securing bolts. The "raw hole" has corresponding grooves, holes, tabs or threaded holes. The sidewall can also be screwed to other locations. Further preferably, one or more sidewalls can be movable in a motorized manner. Smaller openings would then possibly remain, but they do not interfere. The size of the shaft or the position of the sidewall(s) can then be automatically adjusted depending on the pallet being supplied.

The pallet carrying means can preferably be designed as an arrangement of at least two forks or as a plate. Particularly preferably, the pallet carrying means can be designed to be variable in length. For example, the forks can be variable in length and preferably each consist of two parts. Advantageously, the pallet carrying means can then be easily adjusted to different pallet sizes. The pallet carrying means is arranged on a lifting device to be able to move the pallet carrying means along the vertical z-direction. The pallet carrying means is expediently attached to the lifting device in such a way that tilting or turning is avoided. A support region can be used for this purpose, for example, which prevents turning or tilting by supporting the pallet carrying means. This support region of the pallet carrying means can be arranged at least in part in a pit when the pallet carrying means is in the lowermost position.

The lifting device can preferably be designed as a double lifting mechanism. The pallet carrying means is preferably attached to a first lifting device that can bring about a vertical lift of the pallet carrying means. In particular, the vertical lift of the first lifting device can be designed to correspond at least to the maximum stacking height of a pallet or a roll container. In particular, the vertical lift of the first lifting device can be at least 1 m or at least 1.5 m, preferably at least 2.0 m. The vertical displacement takes place in a motorized manner by means of a first drive that can be directly or indirectly connected to the pallet carrying means.

The first lifting device is preferably connected to a second lifting device that can bring about a vertical lift of the first lifting device. The vertical lift of the second lifting device can be greater than the vertical lift of the first lifting device.

In particular, the vertical lift of the second lifting device can be designed to move the finished pallet or the loaded roll container from the pallet through-opening down to an optional wrapping device and onto a conveyor device for transporting the pallet or roll container. In particular, the vertical lift of the first lifting device can be designed to correspond to at least one or at least 1.5 times the maximum stacking height of a pallet or a roll container. In particular, the vertical lift of the first lifting device can be at least 2 m or at least 3 m, preferably at least 4.0 m. The vertical displacement of the second lifting device takes place in a motorized manner by means of a second drive that can be directly or indirectly connected to the first lifting device.

The first drive is preferably activated to carry out a vertical displacement of the pallet during the set-up of the pallet, i.e. the arrangement of goods in layers on the pallet or on the roll container, in such a way that the top layer of the goods on the pallet is located in a predetermined picking plane. It should be understood that, in particular in the case of automated or robot-assisted palletizing, it is important to maintain or know the vertical position of the pallet exactly. The first drive can therefore be equipped with means for determining the position, in particular with resolvers. Alternatively or additionally, at least one position sensor can be provided to determine at least the vertical position of the pallet carrying means or the pallet or the trolley. This position can be transmitted to a system controller or to a robot controller, in particular to take this position into account during palletizing.

The second drive is preferably activated to move an empty pallet from a lowermost position to an uppermost position to carry out order picking or palletizing. In addition, the second drive is activated to move the fully picked pallet down from an upper position, for example to a medium height at which an optional wrapping device wraps the picked pallet with a film to prevent goods on the pallet from slipping or falling off. The same can be done with a trolley or roller cage. Finally, the second drive is also activated to move the picked pallet or the trolley to a lower position in which the pallet or the trolley is relocated to another conveying system in order to transport it away. Preferably, the second drive or the second lifting device merely has to be designed to move to or assume at least two or three, in particular, predetermined, vertical positions that are constant for all pallets or trolleys. Therefore, in contrast to the first drive or the first lifting device, precise position determination is usually not necessary. The second drive can therefore preferably not be equipped with means for determining the position, in particular with resolvers. The positions can, for example, be realized in a simple manner by means of lower and upper stops. Optionally, a middle position can be detected by a middle position sensor if the optional wrapping device is provided.

Preferably, forks for holding the pallet on the upper floor can be provided, which are designed to be long enough relative to the maximum pallet format. The sidewalls then need appropriate cutouts so that the forks can be folded in and out without collision. Alternatively, the forks could be designed to be exchangeable, attachable or expandable by means of a screw connection.

Sensors (for example light barriers) are preferably provided, which are preferably arranged, fastened or installed on, under or in the sidewalls. Attaching sidewalls can disrupt the sensor path. Correspondingly, sensors should be displaceable on a linear axis or designed in such a way that the additional sidewalls do not cause any interference.

A closure device is preferably provided, for example at least one retractable and/or foldable cover. If the pallet is smaller than the maximum pallet format, harmful openings are created through which packages may fall. A closure device, for example a cover, in particular made of sheet metal, can be provided to prevent this. Said closure device can be folded up manually or with motors, or it can be retracted or screwed on.

The loading or packing of the pallet can take place automatically, for example with a robot, in particular with an articulated arm robot, and/or manually. If the (palletizing) robot intended for loading is not active, it should be possible to pack the pallet manually, in particular in the lift wrapper station. Robotic and manual palletizing can advantageously take place at one workstation, in particular in the lift wrapper station, so that the previously customary "manual palletizing stations" without robots in goods distribution centers, which are reserved for packages that cannot be gripped by a robot with grippers, can be replaced. Manual and automatic palletizing stations are currently being considered and designed separately from one another, which means additional work and is also space-intensive.

In order to allow manual packing, an extension of the boom arm of the lift that carries the load receiving means can be provided so that the lift can reach the required height without the need for a front end "system box" that a user would have to reach over. Alternatively or additionally, a pit can be provided so that the pallet can be transferred at the correct height (possibly near ground level) so that the load receiving means, including the boom arm, can be lowered. Alternatively or additionally, the pallet can be moved out to a height of approx. 1500 mm above the ground and then go the "last mile" in the z-direction with a further lift/kinematics (lowering device). If space is available, an inclined plane can also be used.

Currently, palletizing always takes place on a pallet. In Europe, however, there are also roller cages as load carriers, which are now to be included in the system. These roller cages are characterized in that they have sidewalls to prevent goods from falling out. Furthermore, roller cages have rollers as a key differentiating feature, such that they can be moved without additional industrial trucks.

Both a pallet and a roller cage can preferably be handled by the device according to the invention.

The palletizing can preferably take place on a palletizing base, for example a grid/2× fork or plate, and then pushed onto the load carrier (pallet or roller cage). The palletizing process can take place robotically or manually on the palletizing base instead of on the pallet. The wrapper is positioned so that a stack of packages is wrapped, but not the palletizing base. After the wrapped stack of packages has been lowered, the stack can be pushed onto the target load carrier in a suitable manner (i.e. on a pallet or roller cage). For this purpose, there can be a magazine consisting of a) a pallet buffer or queue or b) a roller cage buffer or queue on the lower level of the downstacking system to the right and left of the pallet conveyor technology. Depending on the required load carrier, either a pallet or a roller cage is brought onto the conveyor technology from the side and sent to the lift/wrapper combination. The pushing off can be done by a linear slider or by forks that pull apart so that forces on the stack of packages can be compensated. For this purpose, gripping forks can be placed on the lower level to the side or parallel to the conveyor technology, which gripping forks allow the palletizing base to be pulled apart or operated. After being pushed off, the two parts of the palletizing base can be put back together again, and the locking mechanism can be detached and released again for displacement on the z-axis.

Preferably, palletizing can take place alternately on a pallet and/or a roller cage. An RC and/or a pallet buffer can be provided in each case. The required load carrier can be delivered via the pallet conveyor technology and brought up to the appropriate height.

Embodiments are described below with reference to the figures.

It should be understood that the pallets shown are only to be understood as examples and, as an alternative, trolleys can also be used.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
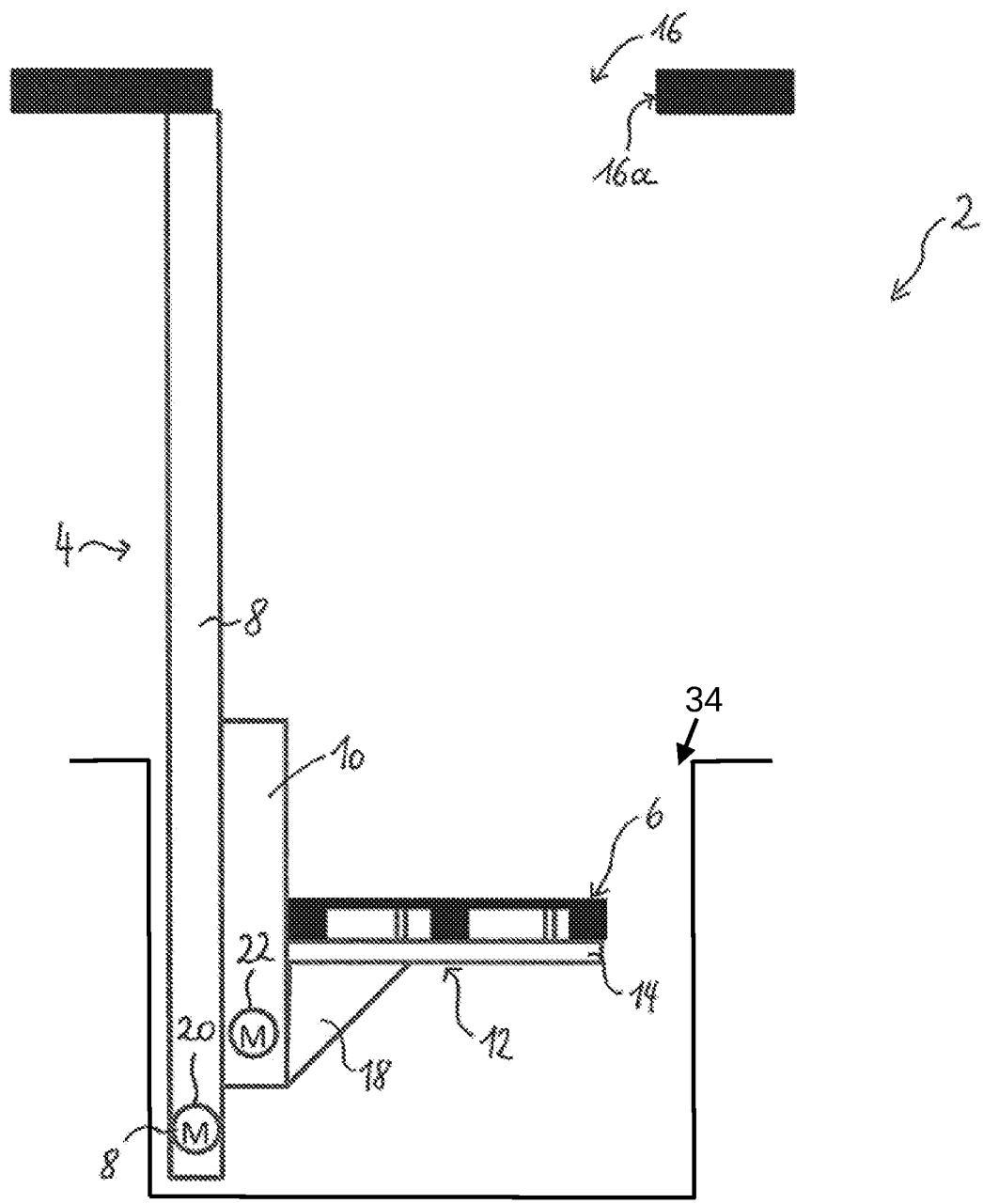
FIG. 1 shows a lifting device of a device for handling a pallet, wherein the pallet is in the lowest position.

FIG. 1 is a side view of a lifting device 4 of a device 2 for handling a pallet 6, wherein the pallet 6 is in the lowest position. The lifting device 4 has a first lifting device 8, which is preferably fastened to the bottom, as well as a second lifting device 10, which is arranged on the first lifting device 8 and to which a pallet carrying means 12 is fastened. A recess 34 may accommodate the pallet carrying means in the lowest position. The pallet carrying means 12 can be designed as an arrangement of at least two forks 14 or as a plate. The pallet 6 arranged on the pallet carrying means 12 can be displaced vertically by means of the lifting device 4, in particular to be guided through the pallet through-opening 16 to be filled with goods or picked in the uppermost position.

The pallet carrying means 12 is attached to the lifting device 4 in such a way that tilting or turning is avoided. For this purpose, a support region 18 is provided in the embodiment shown, which support region prevents turning or tilting by supporting the pallet carrying means 12. Tilting can also be avoided because the pallet through-opening 16 preferably has a gap of less than 50 mm, preferably less than 20 mm, relative to at least one, two, three or all sides of the pallet 6 between the pallet and the opening edge 16a. Minimal tilting, for example on the forks of a forklift, could lead to mechanical contact between the edge 16a of the pallet through-opening 16 and the pallet 6 or the objects arranged thereon.

Figure 2:
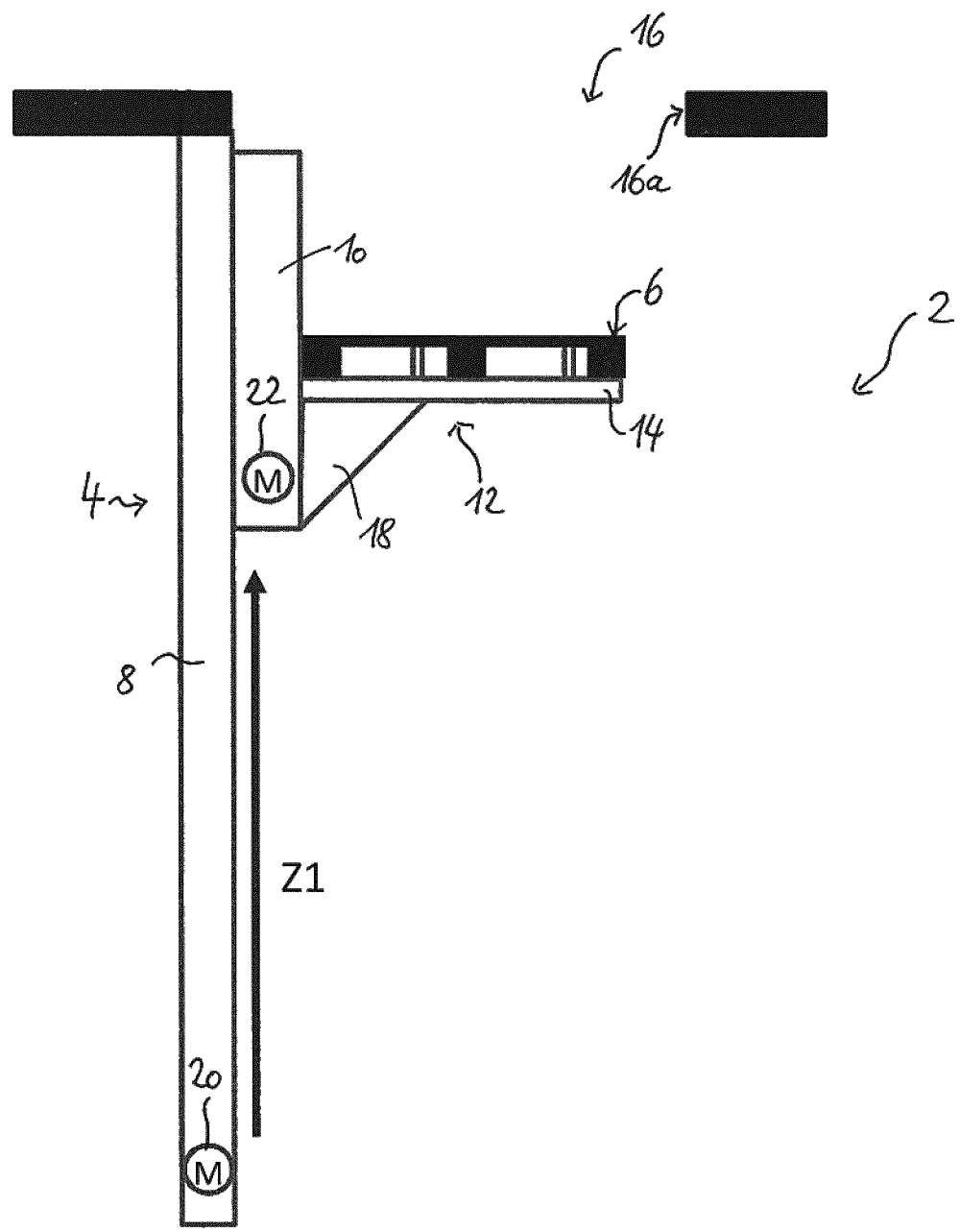
FIG. 2 shows the lifting device from FIG. 1, wherein the pallet is in a central position.

FIG. 2 shows the device from FIG. 1 in a different position. By means of the second lifting device 8, the pallet carrying device 12 was moved to a middle position along the route z1. A displacement further upward of the pallet carrying means 12 is no longer possible with the second lifting device 8. Preferably, this position is recognized in a simple manner by an upper stop of the second lifting device 8, and the second drive 20 of the second lifting device is deactivated. The lifting device 4 is preferably designed in such a way that the pallet 6 is positioned at a height such that it, together with the objects located thereon, is located below the picking plane with a maximum stacking height.

Figure 3:
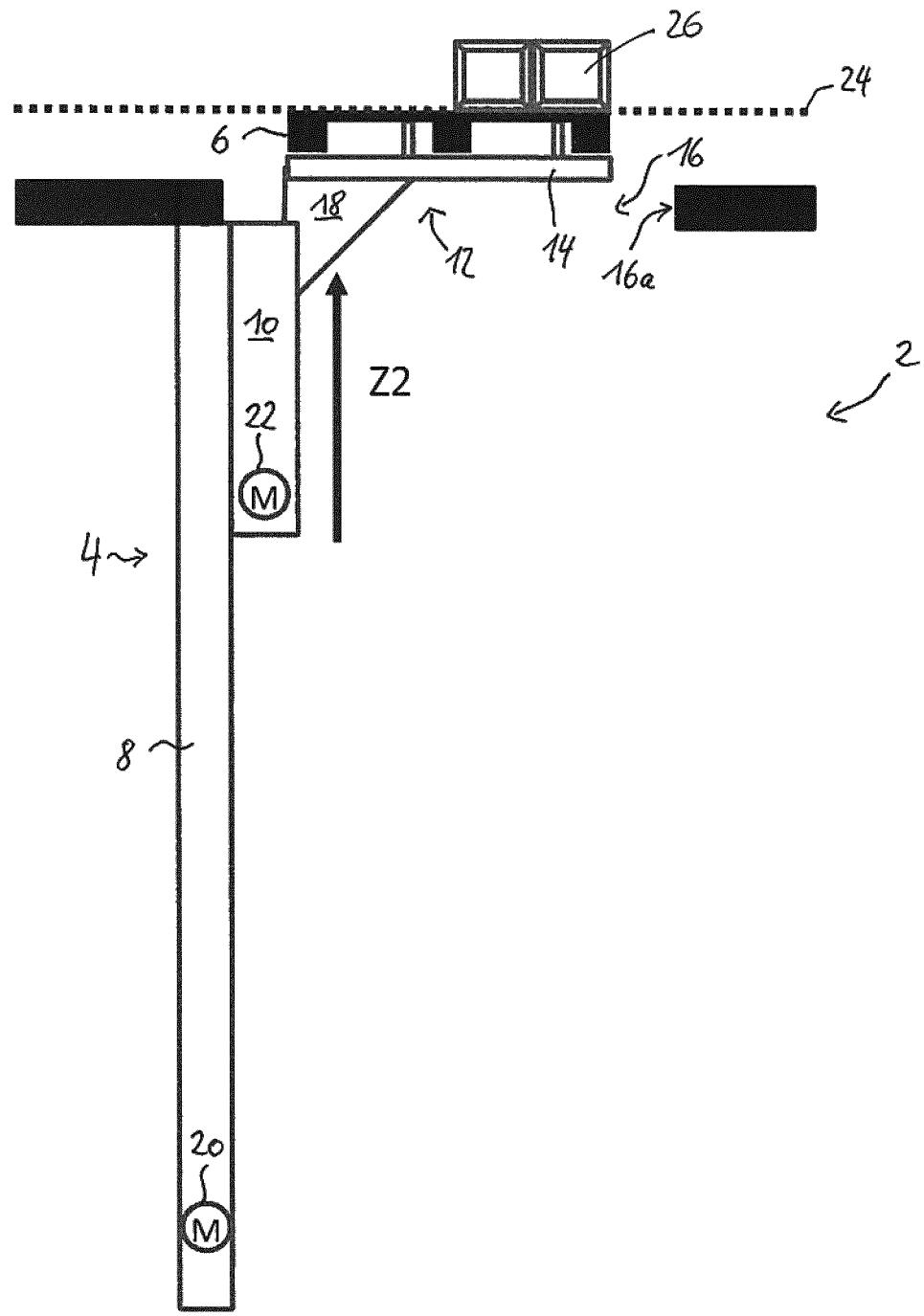
FIG. 3 shows the lifting device from FIG. 1, wherein the pallet is in the uppermost position.

FIG. 3 shows the device 2 from FIGS. 1 and 2 in the uppermost position. By means of the first lifting device 8, the pallet carrying means 12 was moved to the uppermost position along the route z2. A displacement further upward of the pallet carrying means 12 is not possible with the first or with the second lifting device. In this position, the upper edge of the pallet 6 can coincide with the picking plane 24, i.e., the level on which the goods 26 are placed to load the pallet or the roll container. The actual loading process can take place manually and/or automatically, in particular by means of a robot (not shown).

The pallet through-opening 16 is preferably designed in such a way that only a small gap remains between the pallet 6 and the edge 16a of the pallet through-opening 16. It should be understood that, in the embodiment shown, the shape of the pallet through-opening 16 may also have to be adapted to the pallet carrying means 12 and/or to the first lifting device 10. The division into a first and a second lifting device advantageously makes it possible for no space to be necessary in the pallet through-opening 16 for the second lifting device 8, which is generally larger. In other words, the second lifting device 8 does not pass through the pallet through-opening 16 in some regions. The first lifting device 10 also preferably does not protrude through the pallet through-opening or not in some regions, but rather only the pallet carrying means 12 and optionally the support device 18.

In the embodiment shown in FIGS. 1 to 3, the vertical lift z1 of the second lifting device 8 is greater than the vertical lift z2 of the first lifting device 10. In particular, the vertical lift of the first lifting device 10 is designed in such a way that it is sufficient to provide the necessary vertical displacement of the pallet 6 or the roll container from the start of picking to the end of picking. In other words, for the vertical displacement of the pallet 6 during order picking, only or exclusively the first lifting device 10 or the first drive 22 is activated.

Figures 4, 4A:
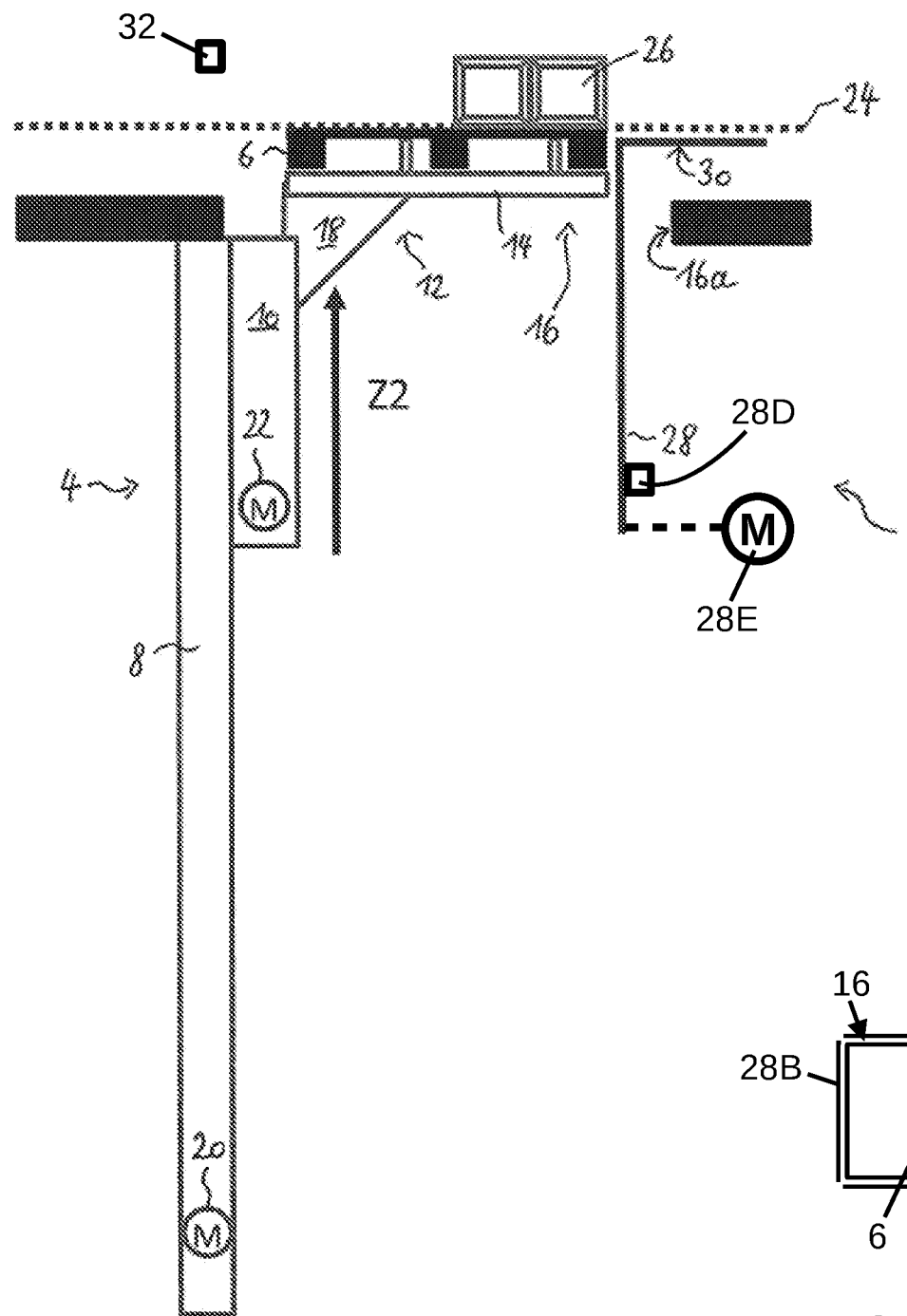
FIG. 4 shows a further lifting device having a variable sidewall in a first position.
FIG. 4A is a simplified vertical cross-section view of the lifting device of FIG. 4.

FIG. 4 is a side view of a further device 2, and FIG. 4A is a simplified vertical cross-section view of the device 2, which substantially corresponds to the device shown in FIGS. 1 to 3, wherein identical elements are provided with the same reference signs. At least one sensor 32 may be provided to determine at least the vertical position of the pallet carrying means 12 or the pallet 6.

The pallet through-opening of the device for handling a pallet (also referred to as a lift wrapper station) has a maximum dimension, i.e. at least one opening of 1000 mm×1000 mm, preferably at least one opening of 1200 mm×1200 mm, particularly preferably an opening of at least 1220 mm×1220 mm.

In this embodiment, there is at least one sidewall 28 in particular four sidewalls 28, 28A, 28B, 28C, that are arranged or mounted on the pallet through-opening 16. Each sidewall 28, 28A, 28B, 28C can be part of a shaft in which the built pallet 6 is arranged such that the palletized goods 26 cannot fall from the pallet 6. The gap between pallet 6 and shaft wall 28, 28A, 28B, 28C is preferably smaller than 50 mm, in particular smaller than 20 mm. One or more of the sidewalls can be arranged in different positions or are displaceable, such as by use of an attachment element 28D. Preferably, the sidewall 28 can be provided by hooking it in (in pre-punched grooves) and provided with securing bolts. The "raw hole" has corresponding grooves, holes, tabs or threaded holes. The sidewall 28 can also be screwed to other locations. In particular, the displacement can only take place manually. The device can thereby advantageously be adjusted in a simple manner to the pallet size or roll container size to be handled. More preferably, one or more sidewalls 28, 28A, 28B, 28C can be designed in such a way that they can be moved in a motorized manner, such as by operation of a motor 28E. Advantageously, different pallet sizes could be loaded one after the other, and the at least one sidewall 28, 28A, 28B, 28C could be adapted according to the current pallet size. Smaller openings would then possibly remain, but they do not interfere. The size of the shaft or the position of the sidewall(s) 28, 28A, 28B, 28C can then be automatically adapted depending on the pallet 6 being supplied.

Corresponding to the sidewall 28, a closure device or cover 30, which at least partially covers the pallet through-opening 16 or the gap between the pallet 6 and the sidewall 38, can be adapted or displaced along a direction x.

Figure 5:
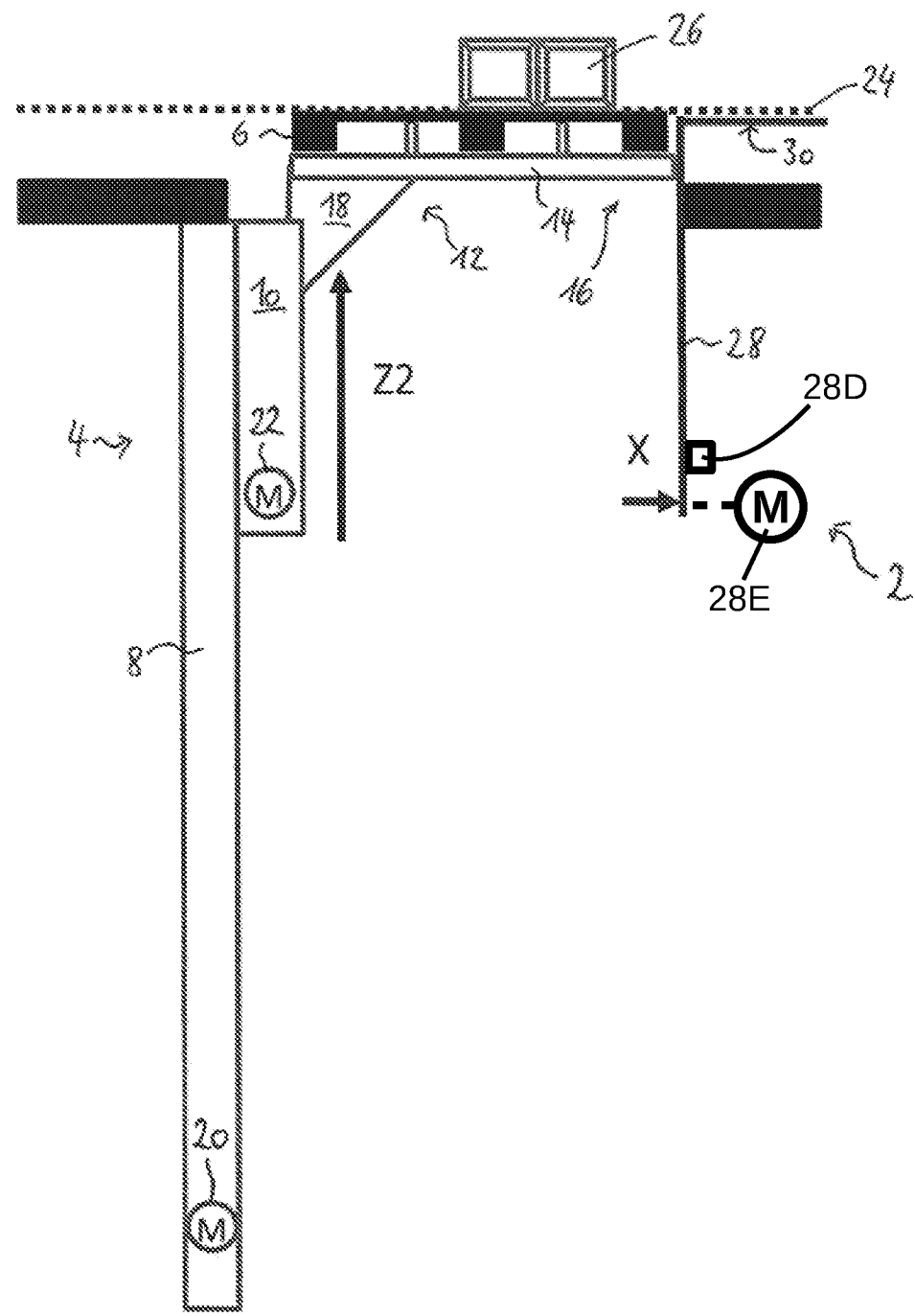
FIG. 5 shows the lifting device from FIG. 4 having the variable sidewall in a second position.

FIG. 5 shows a further view of the device 2 with a different position of the side wall 28 and the closure device or cover 30. The sidewall 28 and the closure device or cover 30 were moved along the direction x starting from the position shown in FIG. 4 to enlarge the pallet through-opening 16 and to be able to pick larger pallets. The pallet through-opening 16 can thus be opened in particular to a maximum opening of 1000 mm×1000 mm, preferably at least one opening of 1200 mm×1200 mm, particularly preferably an opening of at least 1220 mm×1220 mm.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS 2 device
4 lifting device
6 pallet
8 second lifting device
10 first lifting device
12 pallet carrying means
14 forks
16 pallet through-opening
16a opening edge
18 support region
20 second drive
22 first drive
24 picking plane
26 goods
28 sidewall
30 closure device or cover

What is claimed is:

1. A device for handling a pallet, the device comprising:
a pallet through-opening through which a pallet can be vertically moved while the pallet is oriented horizontally, wherein the pallet through-opening has at least one passage which is more than 1200 mm wide and 1200 mm deep;
one or more sidewalls arranged along respective sides of the pallet through-opening;
at least one closure device designed to cover or close at least some regions of the pallet through-opening;
wherein at least one of the sidewalls is arranged for movement with the at least one closure device;
wherein the at least one of the sidewalls and the at least one closure device are, together, detachable or movable;
a pallet carrying means which is designed to carry the pallet;
the pallet carrying means selectively positionable proximate the pallet through-opening;
a first lifting device; and
a second lifting device connected to the first lifting device;
wherein the pallet carrying means is connected to the first lifting device;
wherein, when the first lifting device is at a respective lowermost position and the second lifting device is at a respective uppermost position, the pallet is positioned so that a maximum stacking height of the pallet is located below a picking plane; and
wherein when the first lifting device is at a respective uppermost position and the second lifting device is at the respective uppermost position, an upper edge of the pallet coincides with the picking plane.

2. The device of claim 1, wherein the one or more sidewalls comprises four sidewalls.

3. The device of claim 1, wherein the at least one sidewall and the at least one closure device are movable and/or displaceable only manually.

4. The device of claim 1, wherein the at least one sidewall and the at least one closure device are movable and/or displaceable only in a motorized manner.

5. The device of claim 1, further comprising:
at least one sensor designed to detect the position of the pallet, or an upper edge of the pallet supported on the device.

6. The device of claim 1, further comprising:
a recess designed to receive at least a portion of the pallet carrying means when the pallet carrying means is moved to its lowest position by the first and second lifting devices.

7. The device of claim 1, wherein a length of the pallet carrying means is selectively variable.

8. A device for handling a pallet, the device comprising:
a pallet through-opening through which a pallet can be vertically moved while the pallet is oriented horizontally;
a pallet carrying means which is designed to carry the pallet, the pallet carrying means selectively positionable proximate the pallet through-opening;
a first lifting device;
a second lifting device connected to the first lifting device, the pallet carrying means connected to the first lifting device; and
one or more sidewalls arranged along respective sides of the pallet through-opening;

wherein at least one of the sidewalls is detachable or movable;

wherein, when the first lifting device is at a respective lowermost position and the second lifting device is at a respective uppermost position, the pallet is positioned so that a maximum stacking height of the pallet is located below a picking plane; and wherein when the first lifting device is at a respective uppermost position and the second lifting device is at the respective uppermost position, an upper edge of the pallet coincides with the picking plane.

9. The device of claim 8, wherein a vertical lift of the first lifting device corresponds to at least 1.5 times the maximum stacking height of the pallet.

10. The device of claim 8, wherein a vertical lift of the second lifting device is greater than a vertical lift of the first lifting device.

11. The device of claim 8, wherein the one or more sidewalls comprises four sidewalls.

12. The device of claim 8, wherein the at least one sidewall is movable and/or displaceable only manually.

13. The device of claim 8, wherein the at least one sidewall is movable and/or displaceable only in a motorized manner.

14. The device of claim 8, further comprising:
at least one closure device designed to cover or close at least some regions of the pallet through-opening;
wherein the at least one closure device is detachable or movable.

15. The device of claim 8, further comprising:
at least one sensor designed to detect the position of the pallet, or an upper edge of the pallet supported on the device.

16. The device of claim 8, further comprising:
a recess designed to receive at least a portion of the pallet carrying means when the pallet carrying means is moved to its lowest position by the first and second lifting devices.

17. The device of claim 8, wherein a length of the pallet carrying means is selectively variable.

* * * * *